Nov. 27, 1962   R. V. MATHERS ETAL   3,065,869
DROPLEAF ELEVATING GATE
Filed April 1, 1960   3 Sheets-Sheet 1
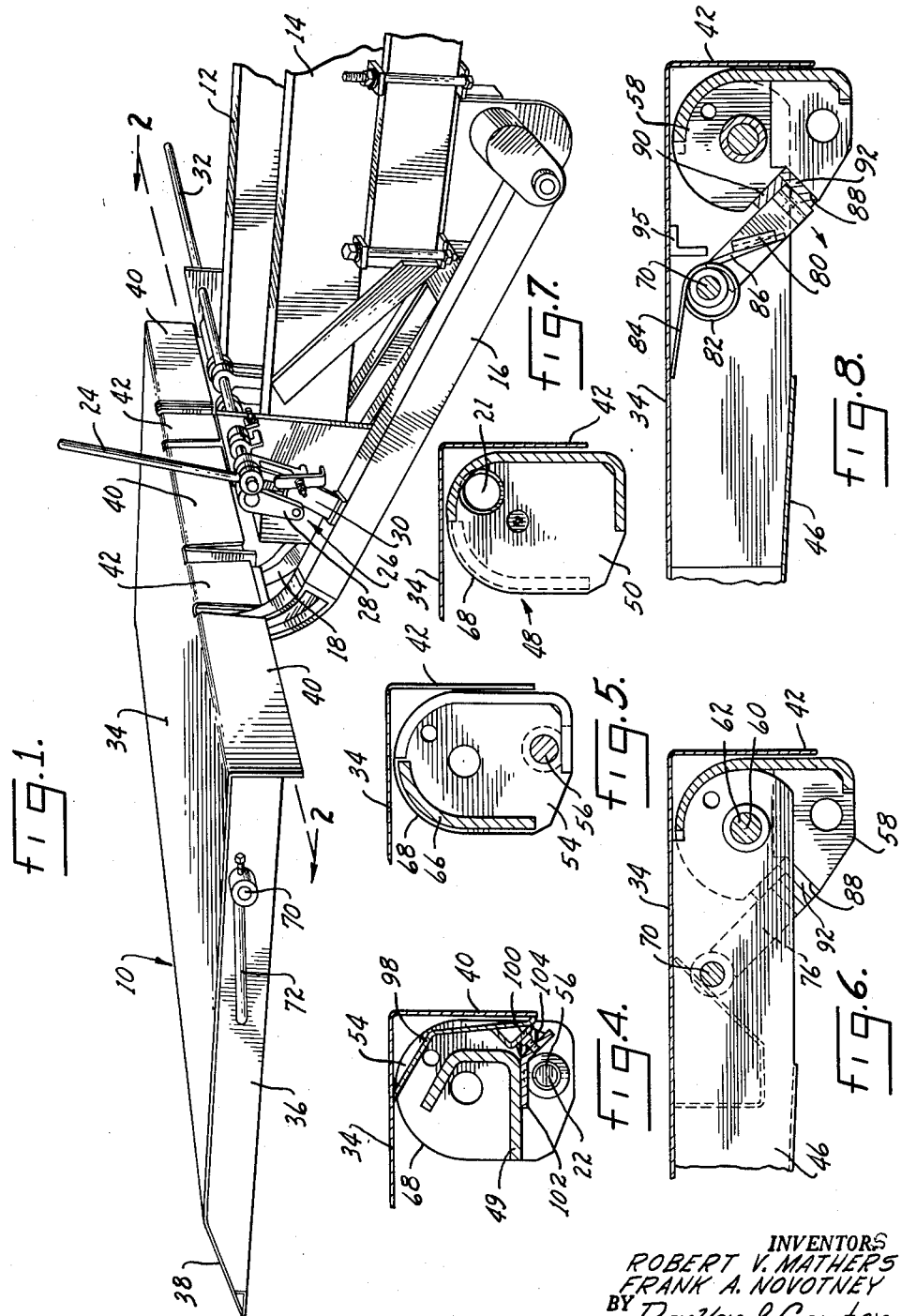
INVENTORS
ROBERT V. MATHERS
FRANK A. NOVOTNEY
BY Parker & Carter
Attorneys.

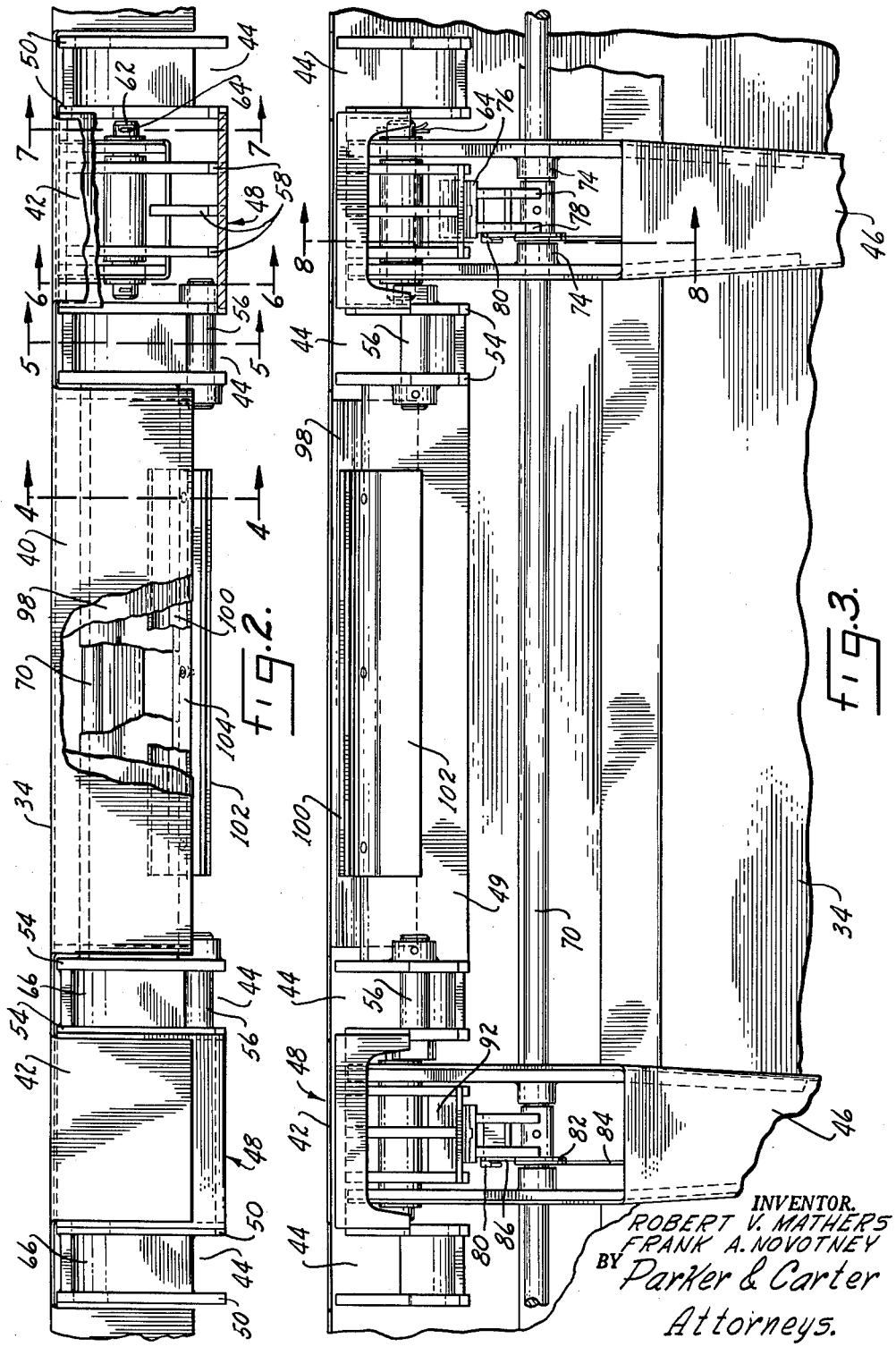

Nov. 27, 1962   R. V. MATHERS ETAL   3,065,869
DROPLEAF ELEVATING GATE
Filed April 1, 1960   3 Sheets-Sheet 3
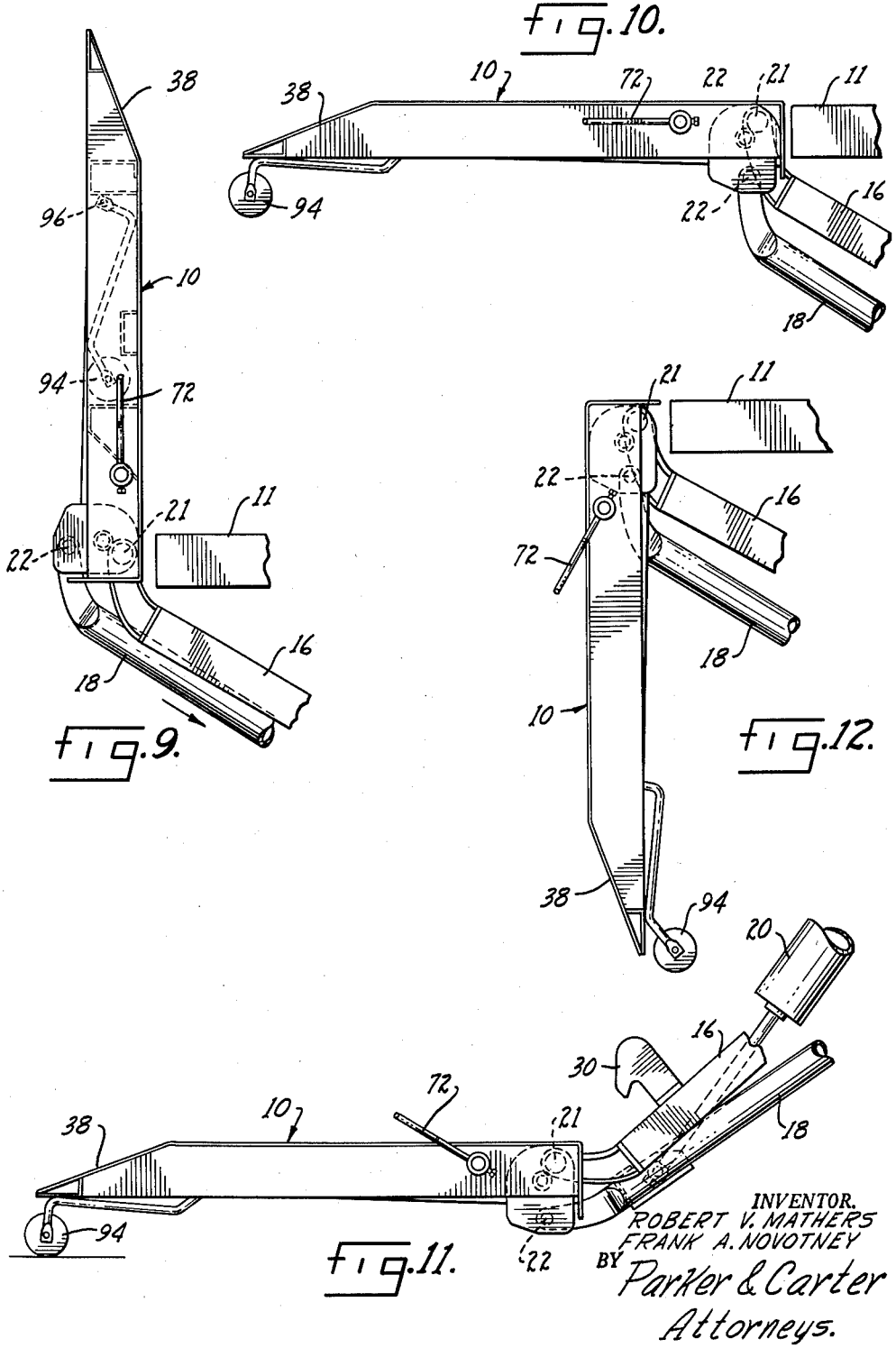
INVENTOR.
ROBERT V. MATHERS
FRANK A. NOVOTNEY
BY Parker & Carter
Attorneys.

United States Patent Office 3,065,869
Patented Nov. 27, 1962

3,065,869
DROPLEAF ELEVATING GATE
Robert V. Mathers and Frank A. Novotney, Streator, Ill., assignors to Anthony Company, Streator, Ill., a corporation of Illinois
Filed Apr. 1, 1960, Ser. No. 19,415
3 Claims. (Cl. 214—77)

This invention relates to a tail gate assembly and in particular to a means for unlocking the tail gate so that it hangs vertically when in the raised position.

One object of this invention is to provide a tail gate assembly whereby the entire tail gate may be released and allowed to hang vertically downward.

Another object is to provide a conventional tail gate assembly, which may be raised or lowered through hydraulic pressure, and which has means for releasing the tail gate when the vehicle is backed up against a loading platform.

Another object is to provide a tail gate assembly having hand operable release means for unlocking the gate so that it may hang vertically downward.

Other objects will appear in the ensuing specification, drawings and claims.

The invention is illustrated diagrammatically in the following drawings wherein:

FIGURE 1 is a perspective view of the tail gate and its support structure,

FIGURE 2 is a generally horizontal section along line 2—2 of FIGURE 1, with portions broken away, FIGURE 3 is a partial bottom view of the tail gate showing the improved release structure, FIGURE 4 is a section along line 4—4 of FIGURE 2.

FIGURE 5 is a section along line 5—5 of FIGURE 2,

FIGURE 6 is a section along line 6—6 of FIGURE 2,

FIGURE 7 is as ection along line 7—7 of FIGURE 2,

FIGURE 8 is a section along line 8—8 of FIGURE 3,

FIGURE 9 is a side elevation of the tail gate in the vertical raised position,

FIGURE 10 is a side elevation of the tail gate in a horizontal raised position,

FIGURE 11 is a side elevation of the tail gate in the horizontal lowered position, and FIGURE 12 is a side elevation of the tail gate in the released position.

Referring now to FIGURE 1, one form of the tail gate of this invention is indicated generally at 10. It is supported from a vehicle by pairs of frame members 12 and 14 which are a part of the vehicle body.

The mechanism for raising and lowering the tail gate to the various positions shown in FIGURES 9 through 12 includes a pair of spaced, rigid arm members 16 and a pair of spaced arm members 18, which may be telescopic. In order to raise and lower the tail gate we have provided a hydraulic cylinder and piston indicated at 20. As clearly seen in FIGURES 9 through 12, the arm members 16 and 18 are each pivotally secured as at 21 and 22 respectively to the tail gate assembly. In the particular form of lift assembly shown herein the rigid arm members 16 are positioned outside of the arms 18 and are pivoted to the tail gate at a point above the pivot point 22 for the arm members 18. The arms 16 and 18 having parallelogram-type movement as the tail-gate is raised and lowered. We have only generally described the mechanism for raising and lowering the tail gate as this structure does not comprise an essential part of the invention. Additionally, there are many other different mechanisms or structures which would operate satisfactorily to raise and lower the tail gate shown herein. The important feature of the invention is the release means for the tail gate itself and not the means for raising and lowering the gate.

FIGURES 9 through 12 illustrate the various positions through which a tail gate, with our release means included thereon, may be moved. In FIGURE 9 the tail gate 10 is in a vertical position as compared with the truck bed 11 so that the gate forms a closure for the rear of the truck. This is the position of the gate when the truck is traveling on the highway. In FIGURE 10 we have shown the tail gate in a horizontal raised position. When the gate is in this position the particular boxes, crates or other freight which have been raised from ground level may be moved onto the bed of the truck with a minimum of effort. FIGURE 11 shows the tail gate in the lowered position. This is generally the position of the tail gate when merchandise is being loaded onto it for raising up to the level of the truck bed, or is being removed from it after being lowered from the truck bed level.

When a truck having a tail gate such as shown herein, is to be loaded from a loading dock or platform generally of the same heighth as the truck bed, such a tail gate is not needed and may be in the way. It is therefore nceessary to provide means whereby the gate may hang vertically downward, as in FIGURE 12, to permit the truck to be backed up against the loading platform. When the tail gate is to be released to swing downwardly, it is first moved to the position shown in FIGURE 11, with the roller wheel positioned as shown.

We have provided a handle 24 which controls a lock mechanism indicated generally at 26 to retain the tail gate when it is in the raised position of FIGURE 10. Rotation of the handle 24 is adapted to move two spaced latch members 28 out of engagement with the spaced hooks 30, one of which is, preferably, on each arm 16. The unlocked position is clearly shown in FIGURE 11. Rotation of the handle 24 rotates a transverse rod 32 and so releases the lock mechanism 26. Again this particular type of lock mechanism is not essential to the invention and so has not been described in detail herein.

Turning now to the one piece tail gate 10, this structure comprises a generally flat plate 34, forming the upper surface, two spaced side members 36, and a generally inclined plate 38 at the rear or outer edge of the platform. That portion of the tail gate which is adjacent the bed of the truck is closed by a plate 40 which is preferably part of the top plate 34 folded over. By having plate 40 a part of plate 34 there is a wear surface on the top of the gate when it is in the position of FIGURE 12.

Turning now to FIGURE 2, the plate 40 has openings 44 which define plate portions 42 which are integral with plate 34. There is a hinge structure positioned behind the plate portions 42. This structure is celarly shown at the right hand side of FIGURE 2. The hinge structure may be a single structure or it may be two separate hinges. Preferably it is a single structure comprising two spaced hinge members 48 secured together by a cross piece 49. Each of the hinge members may be either cast or fabricated.

The interior construction of the tail gate is shown in detail in FIGURES 3 through 8. There are two spaced support members 46, which are generally hollow in form and run throughout the length of the tail gate assembly, from front to rear. Each of these support members is open on its under surface, as shown in FIGURE 3, where the release structure is positioned. Considering now the details of gate construction from the outside of the tail gate toward the inside, FIGURE 7 shows the details of the connection between the rigid arms 16 and the tail gate. A hinge member 48, the end of which is shown in FIGURE 7, is positioned within the tail gate adjacent the plate 40. This hinge member has seven flanges or the like which project toward the interior of the tail gate. The two flanges 50 on the far right, as shown in FIGURES 2 and 3, serve as the connecting means between the arm 16 and the tail gate. Note pivot point 21 in FIGURE 7 about which arms 16 rotate on the flanges 50.

Flanges 54, which are the two flanges at the left of the hinge serve to support and connect the arms 18. As clearly shown in FIGURE 4 pivot point 22 is formed by these two flanges and a small rod 56 mounted therebetween.

The three flanges 58 intermediate the flanges 50 and 54 serve to support a third pivot point 60, as shown in FIGURE 6, about which the tail gate, as a whole, will pivot when released. A suitable small rod 62 is pivotally mounted in the flanges 58 and has the outer ends thereof suitably secured by means of cotterpins or the like 64. The rods 62 form the pivotal connections between the two spaced hinge members 48, which are connected to the truck body through the arms 16 and 18, and the tail gate 10. The tail gate is pivotally mounted on the hinge members and will rotate thereon through the rods 62.

In order that the tail gate may smoothly pivot on the hinge members we have provided a generally rounded or curved surface 66, shown in FIGURE 5, which generally follows the curvature of the flange members. It should be noted that the curvature of the flange members indicated at 68, will permit the top plate 34 of the tail gate to freely pivot about the hinge members. As clearly shown in FIGURES 3, 6 and 8 a rod 70 runs the width of the tail gate and is adapted to release the tail gate upon movement of arm 72 suitably secured thereto at a position outside the tail gate. This arm is clearly shown in FIGURE 1. The rod 70 is supported in the members 46 by suitable bosses 74 positioned on each side of the member 46. Intermediate the bosses 74 is a suitable latch assembly 76 which may include two spaced latch arms 78 each connected to the rod 70. One of the latch arms 78 has a small ear or bridge 80 projecting outwardly therefrom, see FIGURE 8, to provide a means for holding the latches 76 in locked position. A spring 82 is coiled about the rod 70 between the bosses 74 and adjacent the latches 76. This spring has two projecting portions, one of which 84, is pressed against the top plate 34 and the other 86, is pressed against the bridge 80. In the alternative the spring may have a spring portion on each side of the latch assembly 76, with the two portions connected by a cross piece. In this case the bridge 80 is not necessary. The action of the spring 82 thus biases latches 76 against the hinge members 48. As clearly shown in FIGURES 6 and 8 that portion of the hinge members 58 intermediate the flanges 50 and 54 have grooves 88 suitably reinforced by members 90 and 92 to receive the latch 76. The member 90 reinforces the upper slanted portion of the grooves 88 and the member 92 reinforces the lower slanted portion of the grooves 88. When the members are in the position shown in FIGURE 8 the springs 82 bias or force the latches 76 into the grooves 88 in the hinge members, thus holding the tail gate in a horizontal position. In order to release the tail gate from this position, it is necessary to rotate arm 72 and rod 70 which then pivots or rotates latches 76 out of engagement with the hinge members, thus permitting the tail gate to be pivoted, at point 60, on the hinge members. The gate should be at ground level. It is also necessary to take the weight of the gate off the latches. This is accomplished by wheel 94.

A latch stop 95 may be secured to the upper plate 34 and provides a stop for the latch 76 when the tail gate is released. This prevents the spring from pivoting the latches 76 up to a point where they are flush with the top plate 34. In some forms of the invention, the latch stop is not necessary. The tail gate structure disclosed herein is completed by a small wheel 94 suitably secured, as at 96, to the rear of the tail gate. The wheel 94 functions both to take the weight of the gate off the latches so that arm 72 may be rotated. In addition, provides for smooth movement of the gate when it is being moved to or from the position of FIGURE 11.

A support plate 98, shown in FIGURE 4, may be suitably connected to the interior of the gate and supports a small angle 100. A mounting plate 102 may be mounted on cross piece 49 and supports a rubber bumper 104 in position to abut angle 100 when the gate is in the positions of FIGURES 9, 10 and 11.

The use, operation and function of our invention are as follows:

We have shown and described herein a release means suitable for unlocking or releasing an entire tail gate so that the truck may be backed up against a loading dock without the tail gate being in the way. Such a release means is essential as in general most vehicles equipped with a tail gate such as shown herein will unload and load both from facilities having loading docks and those without. It is therefore necessary that the tail gate be operable where there be no loading dock facilities and it is equally necessary that means be provided for effectively removing the tail gate when the truck is being loaded from facilities having a raised platform or loading dock. The sequence of operations necessary to release the tail gate shown herein are as follows.

First the tail gate is moved through the positions shown in FIGURES 9 and 10 to the lowered position of FIGURE 11, and the roller wheel is put into position shown. The lock 26, which functions to take the load off the hydraulic system when the tail gate is in the position of FIGURE 10 being released prior to moving the tail gate from the position of FIGURE 10 to that of FIGURE 11.

While the gate is in the position of FIGURE 11 and the load is taken off the latches, the handle 72 is rotated to release the latches 76 from the grooves 88 in the hinge members. This releases the tail gate. The operator of the truck then starts to raise the tail gate just as if he was raising it to the position of FIGURE 10. However now, as the gate is released, it will be moved to the position of FIGURE 12. When the gate is in this position the lock 26 should again be operated to remove the load of the gate from the hydraulic system.

In order to move the gate so that it again may be utilized as a tail gate the opposite sequence of steps is followed. For example, the gate is lowered from the position of FIGURE 12 to that of FIGURE 11 at which point the latches 76 are again placed in engagement with the hinge members to thereby lock the tail gate. When the gate is lowered it is swung out so that the roller wheel engages the ground at a point outside the center pivot so that the gate will unfold. Once the gate is latched it may be moved to any position and again may be utilized as a tail gate.

Of particular note in the invention is the fact that the entire one piece gate will rotate about pivot point 60. This enables the driver of the truck to bring the rear of the truck quite close to a loading dock. The bed of the truck is separated from the truck only by the thickness of the tail gate. The edge of the platform is flush with the bed of the truck when the gate is in the released position so that there will be an uninterrupted surface for loading from the dock to the bed of the truck. We have placed a small wheel 94 at the rear of the tail gate so that when the gate is being raised from the position shown in FIGURE 11 to that shown in FIGURE 12, the rear portion of the gate will not scrape or be dragged along the ground. As stated before, the gate also takes the load off latches 76.

Whereas the operation of the tail gate has been described as following a certain sequence of steps whereby the gate is released when it is in its lowered position, it should be realized that the gate may also be released from the position of FIGURE 10.

Whereas we have described and shown the preferred form of the invention it should be realized that there are

We claim:

1. A tailgate assembly for a truck or the like including a support adapted to be mounted on a truck body, a single unit tailgate platform pivotally mounted on said support, a lifting means mounted on the support and connected to the tailgate, said lifting means adapted to move said tailgate platform from a raised position substantially level with the truck body to a lowered position, said tailgate platform including a single continuous upper cover member and a back plate generally at right angles thereto and integral therewith, said back plate being generally vertical when the platform is horizontal and forming a generally horizontal working surface when the platform hangs vertically downward, a pair of spaced braces generally perpendicular to the pivotal axis of said platform, said braces being in continuous contact, along their upper surface, with said cover member, said braces supporting said platform on its pivot point, latching means for holding said tailgate platform horizontal in both its raised and lowered position, said latching means including a pair of spaced hinges mounted within said tailgate platform and pivotally connected to said support, said tailgate platform being pivotal about said hinges, a pair of latch members each pivotally connected to said platform and urged toward a hinge member, a pivotal handle for releasing said latch members to permit said tailgate platform to hang generally vertically downward when in the raised position, said handle pivoting about the same axis as said latch members.

2. The structure of claim 1 further characterized in that each of said hinges has grooves therein adapted to receiver said latch members, the weight of said tailgate platform maintaining said latch members in said grooves.

3. The structure of claim 1 further characterized by and including a laterally extending rod mounted on said tailgate platform, said latch members and handle being mounted for pivotal movement with said rod.

References Cited in the file of this patent

UNITED STATES PATENTS

| | | |
|---|---|---|
| 2,683,539 | Corley | July 13, 1954 |
| 2,850,187 | Roberts | Sept. 2, 1958 |